United States Patent
Yamada et al.

(10) Patent No.: US 7,604,752 B2
(45) Date of Patent: Oct. 20, 2009

(54) PHOSPHOR AND FLUORESCENT LUMINOUS TUBE

(75) Inventors: Tomohiro Yamada, Chiba (JP); Masahiro Kato, Chiba (JP); Tadaomi Mori, Chiba (JP); Hitoshi Toki, Chiba (JP)

(73) Assignee: Futaba Corporation, Chiba (JP)

( * ) Notice: Subject to any disclaimer, the term of this patent is extended or adjusted under 35 U.S.C. 154(b) by 156 days.

(21) Appl. No.: 11/338,764

(22) Filed: Jan. 25, 2006

(65) Prior Publication Data
US 2006/0175576 A1   Aug. 10, 2006

(30) Foreign Application Priority Data
Feb. 7, 2005   (JP) .............................. 2005-030627

(51) Int. Cl.
*C09K 11/67* (2006.01)
(52) U.S. Cl. ............................. 252/301.4 F; 313/486; 428/403; 428/404
(58) Field of Classification Search ........... 252/301.4 F; 313/486; 428/403, 404
See application file for complete search history.

(56) References Cited

U.S. PATENT DOCUMENTS

| | | | | | |
|---|---|---|---|---|---|
| 4,680,231 | A | * | 7/1987 | Yamaura et al. | 428/407 |
| 5,723,224 | A | * | 3/1998 | Toki et al. | 428/570 |
| 7,071,609 | B2 | | 7/2006 | Tsuji et al. | |
| 2004/0227451 | A1 | * | 11/2004 | Tsuji et al. | 313/484 |

FOREIGN PATENT DOCUMENTS

| | | |
|---|---|---|
| CN | 1550541 A | 12/2004 |
| JP | 10-302714 | 11/1998 |
| KR | 10-2004-0076528 | 9/2004 |

OTHER PUBLICATIONS

Abstract for KR 2004-76528, Sep. 2004.*

* cited by examiner

*Primary Examiner*—C. Melissa Koslow
(74) *Attorney, Agent, or Firm*—Bacon & Thomas, PLLC (57) ABSTRACT

A $SrTiO_3$:Pr phosphor includes a $SrTiO_3$:Pr phosphor material and an additive having one or more elements selected from the group consisting of W, Mo and V in a form of an elemental substance and/or a compound. A total amount of one or more elements included in the additive is in a range from 0.1 wt % to 30 wt % of the $SrTiO_3$:Pr phosphor. The additive is $WO_3$ and a particle size distribution of $WO_3$ is such that a weight of $WO_3$ whose particle diameters are in a range from 0.2 to 0.4 μm is not less than 70% of a total weight of $WO_3$. A fluorescent luminous tube includes the $SrTiO_3$:Pr phosphor.

11 Claims, 8 Drawing Sheets

PHOSPHOR AND FLUORESCENT LUMINOUS TUBE

FIELD OF THE INVENTION

The present invention relates to an $SrTiO_3$:Pr phosphor whose life span is improved and a fluorescent luminous tube using the $SrTiO_3$:Pr phosphor.

BACKGROUND OF THE INVENTION

In various kinds of display devices including a fluorescent display device whose light emitting unit employs a phosphor, a luminous color of the phosphor needs to be diversified to make a display thereof more diverse and more effective. Phosphors including cadmium (Cd) are known as phosphors for emitting light whose emission wavelengths range from yellow to red. However, since cadmium (Cd) is an environmentally unfriendly material, many restrictions are tend to be imposed very often when cadmium (Cd) is employed industrially, so that the employment of cadmium (Cd) needs to be reduced.

Therefore, an $SrTiO_3$:Pr phosphor is recently developed as an alternative material. However, when the $SrTiO_3$:Pr phosphor is used in a fluorescent luminous tube, a life span thereof is not favorable, and a scope of its application is limited.

Therefore, to solve the above-described problems, a method for improving the life span by adding Bi to the phosphor (for example, see Japanese Laid-Open Application No. H8-283709) is proposed, and, based on an observation that the life span of the phosphor is deteriorated due to the fact that barium (Ba) emitted from a filament thereof is attached thereto, a method for preventing a surface of the phosphor from being reduced by coating a substantially entire surface of the phosphor with a thin film of tungsten (W) (for example, see Japanese Laid-Open Application No. 2004-238549) is also proposed.

However, the conventional methods described above are not so effective, and, even when these methods are employed, the life span of the $SrTiO_3$:Pr phosphor highly demanded as a phosphor for emitting light whose emission wavelength ranges from yellow to red is not sufficiently improved to make it attractive for a practical application. To be specific, whereas, for example, a ZnO:Zn phosphor which is widely used because its emission wavelength ranges from blue to green and its life span is sufficiently long has a life span of 30 kh, the conventional $SrTiO_3$:Pr phosphor has a life span as short as 1 to 5 kh, and the conventional methods described above cannot improve the life span of the conventional $SrTiO_3$:Pr phosphor to a make it appealing for a practical application.

SUMMARY OF THE INVENTION

It is, therefore, an object of the present invention to provide an $SrTiO_3$:Pr phosphor to be used for an anode light emitting unit of a fluorescent display tube whose life span is improved enough to make it appealing for a practical application and a fluorescent luminous tube using the phosphor.

In accordance with one aspect of the present invention, there is provided a $SrTiO_3$:Pr phosphor including a $SrTiO_3$:Pr phosphor material and an additive including one or more elements selected from the group consisting of W, Mo and V in a form of an elemental substance and/or a compound.

In accordance with another aspect of the present invention, there is provided a fluorescent luminous tube including the $SrTiO_3$:Pr phosphor described above.

According to findings of the inventors of the present invention, if an initial brightness of a conventional $SrTiO_3$:Pr phosphor is set to be 100 and a brightness thereof after a 1000 hour continuous lighting for a display of a fluorescent display tube is 52, the $SrTiO_3$:Pr phosphor in accordance with the present invention to which an additive including tungsten (W), molybdenum (Mo) and/or vanadium (V) is added can secure an initial brightness of about 70% or more of that of the conventional $SrTiO_3$:Pr phosphor, which is reasonable for practical application, as well as a brightness after a 1000 hour continuous lighting not less than that of the conventional $SrTiO_3$:Pr phosphor. Thus, life span characteristics of the $SrTiO_3$:Pr phosphor can be improved to make it attractive for a practical application.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENT

The inventors of the present invention have found that the life span of the $SrTiO_3$:Pr phosphor is deteriorated mainly because barium (Ba) contained in electron emitting material in a filament cathode of a fluorescent display tube is released during an operation of the display tube and then attached to the phosphor to thereby reduce an oxide on a surface of the phosphor.

Therefore, the inventors performed experiments for measuring the life span of the light emission of the display tube in cases where various kinds of materials were added to protect the phosphor from barium (Ba) emitted from the filament, and found that the life span was able to be improved by adding tungsten (W), molybdenum (Mo) and/or vanadium (V).

According to findings of the above experiment, the additive of the $SrTiO_3$:Pr phosphor may include an elemental substance and/or a compound thereof such as an oxide. Further, the additive may include a mixture of several elemental substances and/or compounds thereof. In addition, it was found that the life span could be improved more efficiently if the additive resides on surfaces of grains of the SrTiO$_3$:Pr phosphor in a granulated shape rather than as a uniform film.

Hereinafter, six preferred embodiments of the present invention will be described with reference to FIGS. 1 to 7 and Tables 1 to 7.

First Embodiment

Figure 1:
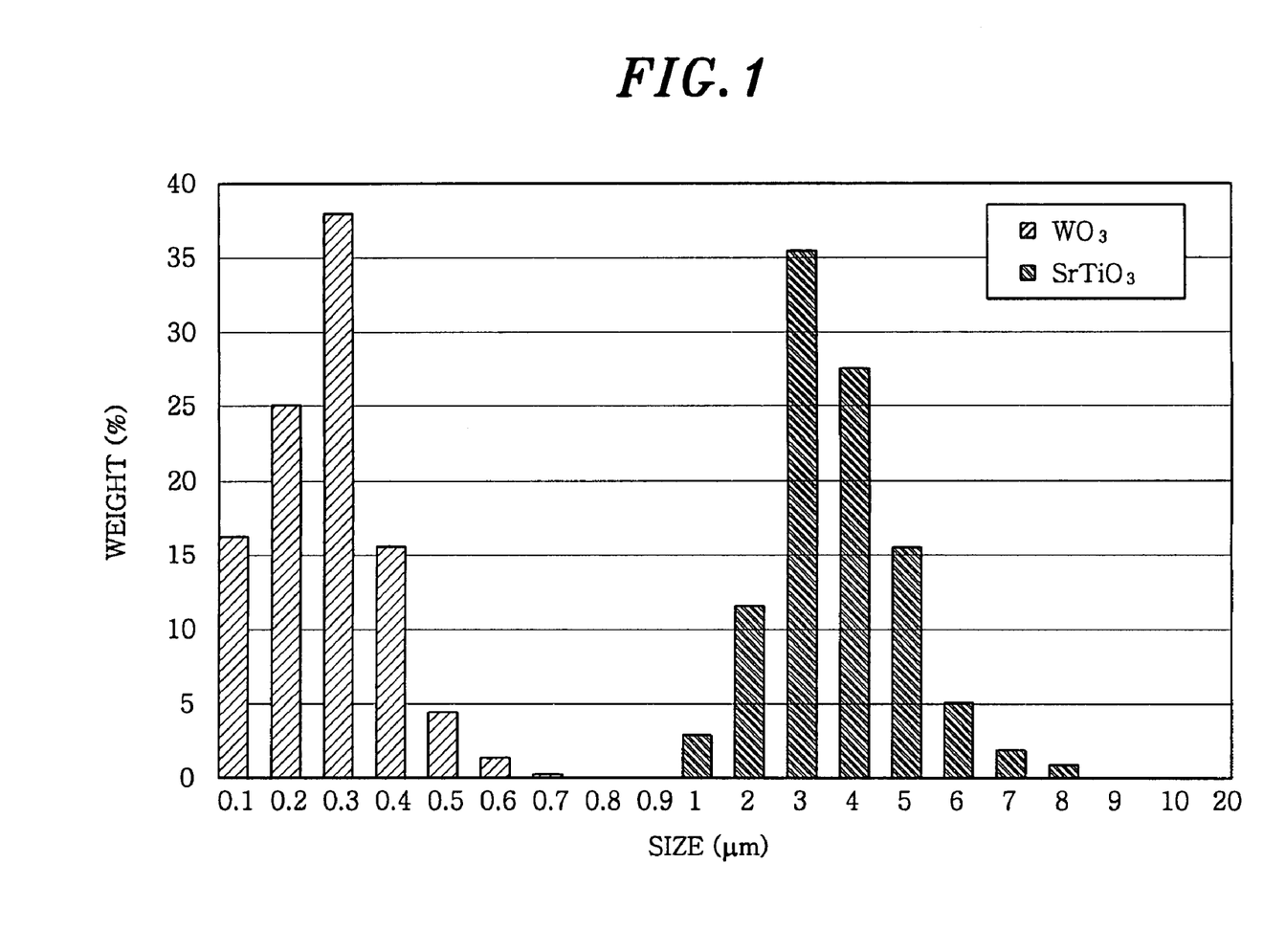
FIG. 1 shows a bar graph illustrating particle size distribution of $WO_3$ and that of a $SrTiO_3$:Pr phosphor in accordance with a first embodiment of the present invention.
Figure 2:
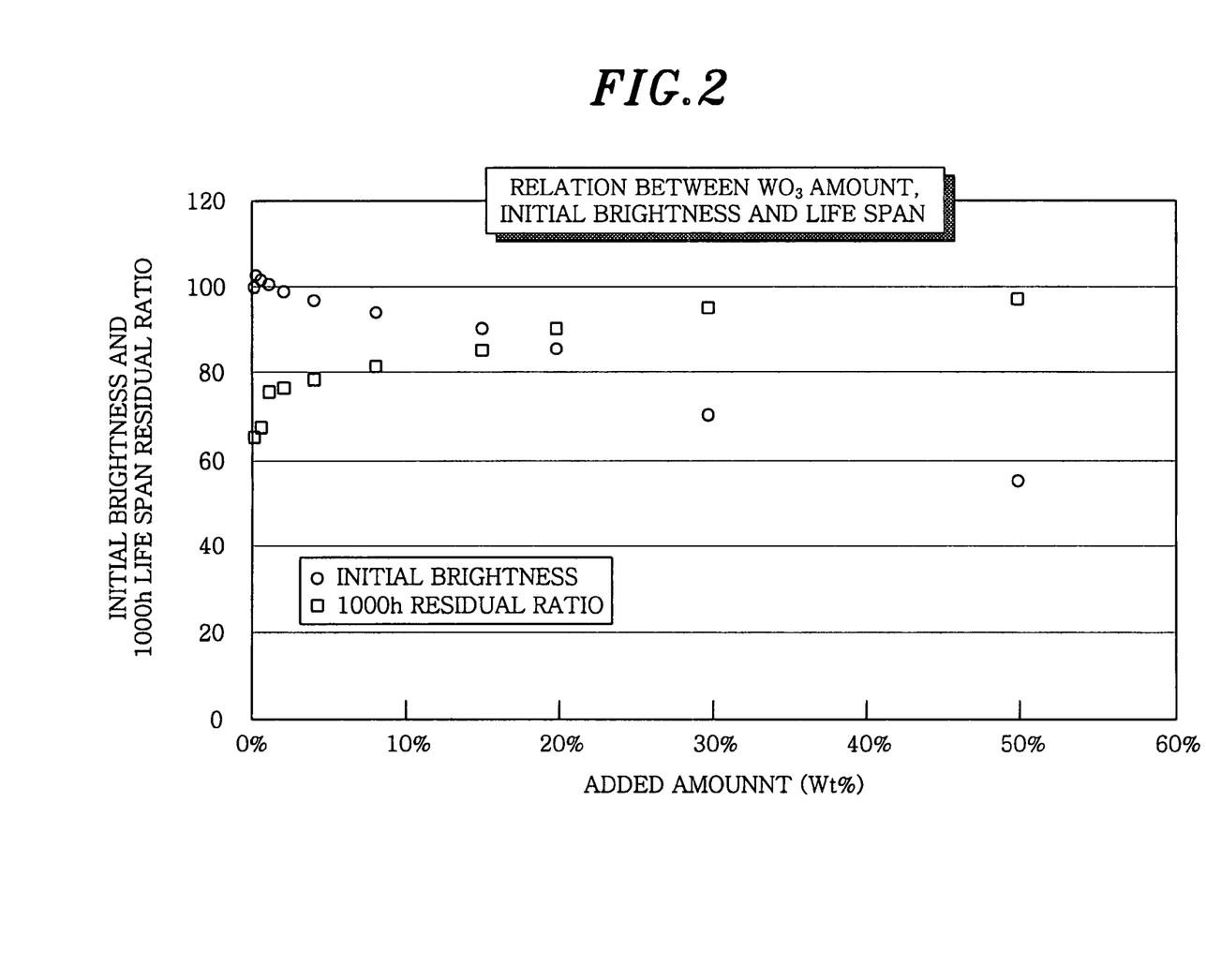
FIG. 2 illustrates a dependence of the initial brightness and that of the life span on an added amount of $WO_3$ in accordance with the first embodiment of the present invention.
Figure 3:
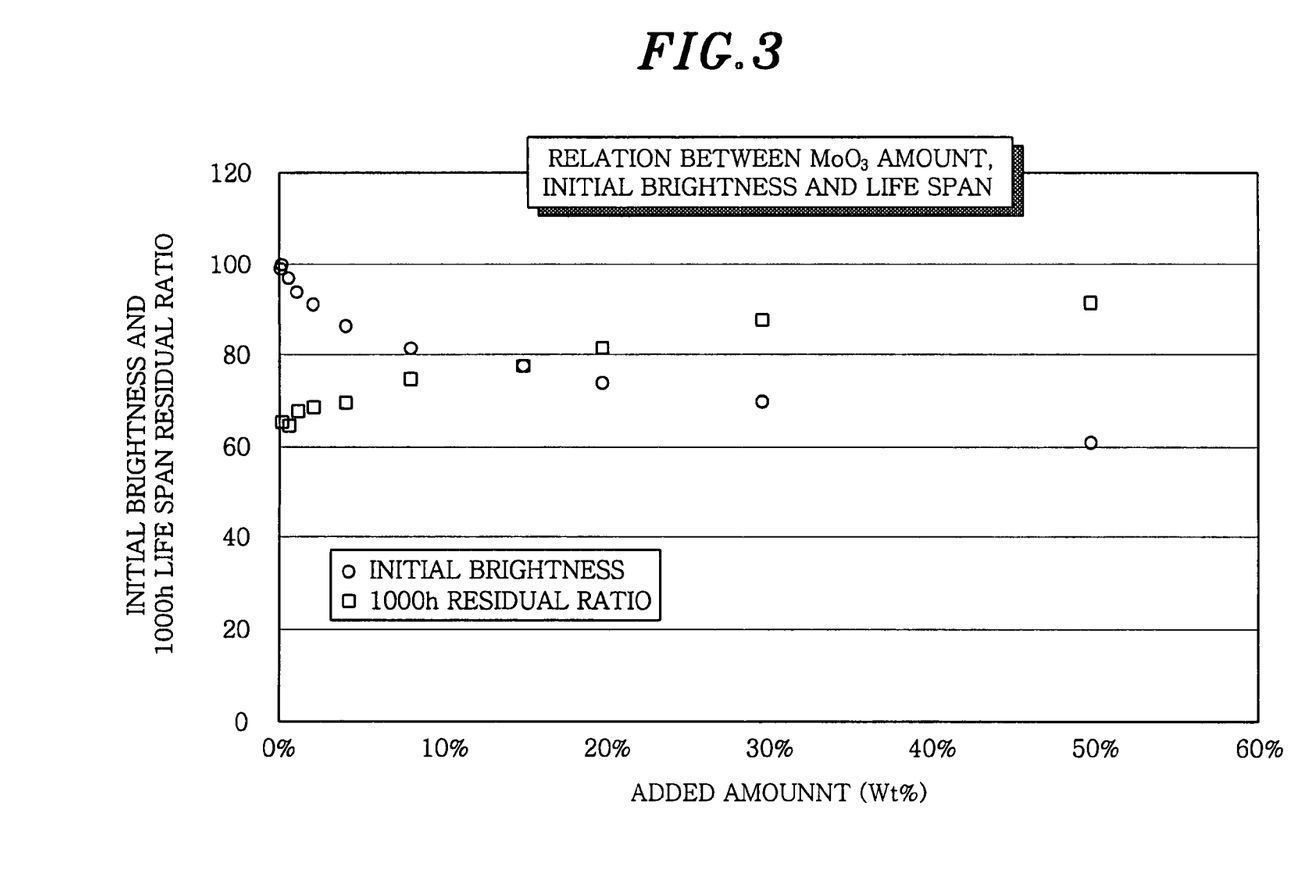
FIG. 3 depicts a dependence of the initial brightness and that of the life span on an added amount of $MoO_3$ in accordance with a second embodiment of the present invention.

In accordance with a first embodiment of the present invention, WO$_3$ powder of a particle size distribution shown in FIG. 1 and Table 1 is, as an additive, added and mixed with SrTiO$_3$:Pr phosphor material powder of a particle size distribution shown therein to form a printing paste. The WO$_3$ powder has a particle size distribution such that the particles amounting to about 70% of the total weight of the WO$_3$ powder are in a particle diameter range from 0.2 to 0.4 μm.

Further, the SrTiO$_3$:Pr phosphor material powder has a particle size distribution such that the particles amounting to about 70 wt % of the total weight of the SrTiO$_3$:Pr phosphor material are in a particle diameter range from 2 to 4 μm.

TABLE 1

| Size (μm) | WO$_3$ (%) | SrTiO$_3$ (%) |
|---|---|---|
| 0.1 | 16 | 0 |
| 0.2 | 25 | 0 |
| 0.3 | 38 | 0 |
| 0.4 | 15.4 | 0 |
| 0.5 | 4.3 | 0 |
| 0.6 | 1.1 | 0 |
| 0.7 | 0.2 | 0 |
| 0.8 | 0 | 0 |
| 0.9 | 0 | 0 |
| 1 | 0 | 2.8 |
| 2 | 0 | 11.5 |
| 3 | 0 | 35.3 |
| 4 | 0 | 27.3 |
| 5 | 0 | 15.4 |
| 6 | 0 | 5 |
| 7 | 0 | 1.9 |
| 8 | 0 | 0.8 |
| 9 | 0 | 0 |
| 10 | 0 | 0 |
| 20 | 0 | 0 |

The added amount of the WO$_3$ powder when converted to W, i.e., the added amount of tungsten (W) included in the WO$_3$ powder, is changed stepwise in a range from 0 to 50 wt % including a range from 0.1 to 30 wt % as shown in a left column of Table 2 to form several kinds of printing pastes. Herein, the range from 0 to 50 wt % is that of weight ratio of an added element, i.e., tungsten (W) in this case, with respect to the SrTiO$_3$:Pr phosphor. Herein, 0 wt % represents a state before the improvement where no additive was added to the SrTiO$_3$:Pr phosphor.

TABLE 2

| WO$_3$ Amount | Initial Brightness | 1000 h Residual Ratio |
|---|---|---|
| 0 wt % | 100 | 52 |
| 0.10 wt % | 103 | 65 |
| 0.50 wt % | 102 | 67 |
| 1 wt % | 101 | 75 |
| 2 wt % | 99 | 76 |
| 4 wt % | 97 | 78 |
| 8 wt % | 94 | 81 |
| 15 wt % | 90 | 85 |
| 20 wt % | 85 | 90 |
| 30 wt % | 70 | 95 |
| 50 wt % | 55 | 97 |

Figure 8:
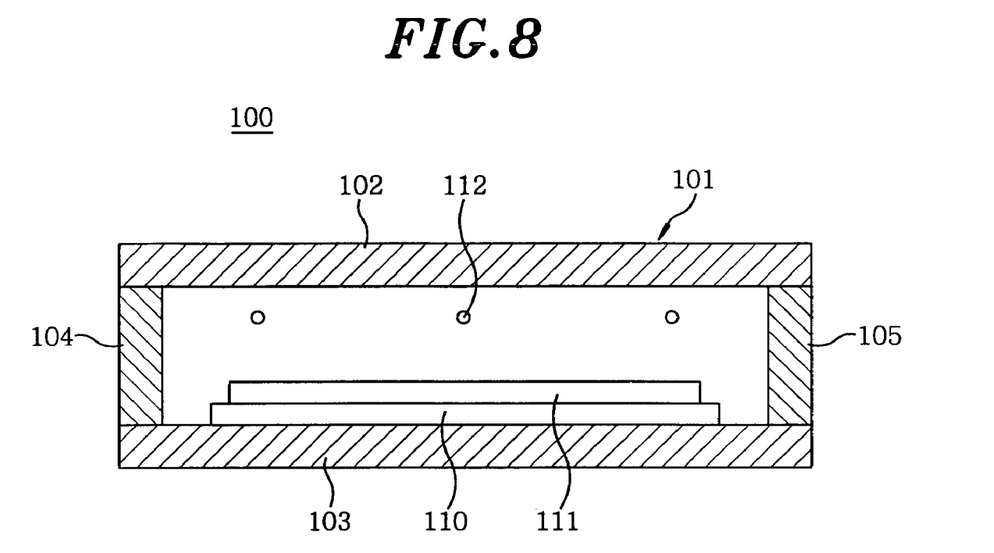
FIG. 8 shows a schematic cross sectional view of an exemplary fluorescent display tube which can be employed in any of the first to sixth embodiments.

FIG. 8 shows a schematic cross sectional view of an exemplary fluorescent display tube 100 which can be employed in the present embodiment. Each printing paste produced as described above is then coated on an anode electrode 110 of a fluorescent display tube 100 and baked at 500° C. Thus, as shown in FIG. 8, a phosphor layer 111 is formed on the anode electrode 110 on a base substrate 103. Thereafter, filament cathodes 112 are positioned above the anode electrode 111, and a casing 101 of an open box shape is covered thereon and sealed. Finally, an inside of the fluorescent display tube 100 is evacuated to a high vacuum state, wherein the casing 101 includes a top plate 102 and side plates 104 and 105. In this manner, several kinds of fluorescent display tubes were obtained at several stages in the range from 0 to 50 wt % of the added amount of the WO$_3$ powder.

The brightness characteristics, i.e., an initial brightness and a residual ratio of brightness after a 1000 hour continuous lighting (also referred to as "1000 h residual ratio"), were measured by connecting a 30 V voltage source to the anode electrode, so that the results shown in a middle and a right column of Table 2 were obtained for the respective fluorescent display tubes in which the WO$_3$ powder was added in the added amount as shown in a left column of Table 2.

Referring to the result shown in Table 2, in the state before the improvement where the added amount of WO$_3$ was 0%, the initial brightness is represented by 100 as a relative value, and the residual ratio of the brightness after the 1000 hour continuous lighting is 52% of the initial brightness. Therefore, the relative value of the brightness after the 1000 hour continuous lighting is 52 with respect to the initial brightness in the state before the improvement where WO$_3$ was not added.

Considering the effect on the life span and the relative attenuation in the initial brightness, the life span of the SrTiO$_3$:Pr phosphor can be improved to make it attractive for a practical application if the added amount of the WO$_3$ is in the range between 0.1 wt % and 30 wt % shown in Table 2. That is, in this range, the initial brightness (which is in a range from 70 to 103) is not less than 70% of that in the state before the improvement, and the residual ratio of the brightness after 1000 hour lighting (which is in a range from 65 to 95) is higher than that in the state before the improvement, which means that the brightness after 1000 hour lighting is in a range from about 67 to 77.

Further, when the added amount is 50% in this embodiment, since the initial brightness is about 55 and the residual ratio of the brightness after the 1000 hour continuous lighting is 97%, the relative brightness after the 1000 hour continuous lighting amounts to about 53.5 to thereby surpass 52, which is the brightness after the 1000 hour continuous lighting in the state before the improvement. Therefore, the effective range of the added amount is between 0.1 and 50 wt %. Preferably, the range from 0.1 to 30 wt % is more effective as described above. Moreover, the range from 1 to 20 wt % is more preferable in that the brightness after the 1000 hour continuous lighting is in a range from about 75 to 77.

Investigating a surface condition of the SrTiO$_3$:Pr phosphor to which WO$_3$ was added by using an EDX or XPS analysis, it was observed that WO$_3$ grains were attached to surfaces of SrTiO$_3$:Pr phosphor grains to reside thereon. This can be interpreted to be resulted from the WO$_3$ grains being partially melted to be attached to the surfaces of the SrTiO$_3$:Pr phosphor grains when the printing paste of the SrTiO$_3$:Pr phosphor to which WO$_3$ was added was baked at 500° C. in a fabrication process of the fluorescent display tube.

Second Embodiment

In accordance with a second embodiment of the present invention, MoO$_3$ powder is, as an additive, added and mixed with SrTiO$_3$:Pr phosphor material powder to form a printing paste. Respective particle size distributions of the MoO$_3$ powder and the particle size distribution of the SrTiO$_3$:Pr phosphor material powder in the second embodiment are same as those of the WO$_3$ powder and the SrTiO$_3$:Pr phosphor material powder in the first embodiment.

The added amount of the MoO$_3$ powder, when converted to Mo, is changed stepwise in a range from 0 to 50 wt % including a range from 0.1 to 30 wt % as shown in a left column of Table 3 to form several kinds of printing pastes. Herein, the range from 0 to 50 wt % is that of a weight ratio of molybdenum (Mo) with respect to the SrTiO$_3$:Pr phosphor. Herein, 0% represents a state before the improvement where no additive was added to the SrTiO$_3$:Pr phosphor.

TABLE 3

| MoO$_3$ Amount | Initial Brightness | 1000 h Residual Ratio |
| --- | --- | --- |
| 0 wt % | 100 | 52 |
| 0.10 wt % | 101 | 66 |
| 0.50 wt % | 98 | 65 |
| 1 wt % | 95 | 68 |
| 2 wt % | 92 | 69 |
| 4 wt % | 87 | 70 |
| 8 wt % | 82 | 75 |
| 15 wt % | 78 | 78 |
| 20 wt % | 74 | 82 |
| 30 wt % | 70 | 88 |
| 50 wt % | 61 | 92 |

Then, each printing paste is coated on an anode electrode of a fluorescent display tube to be baked at 450° C., so that several kinds of fluorescent display tubes were obtained in same sequences as in the first embodiment.

The brightness characteristics, i.e., an initial brightness and a residual ratio of brightness after a 1000 hour continuous lighting, were measured by connecting a 30V voltage source to the anode electrode, so that the results shown in a middle and a right column of Table 3 were obtained for the respective fluorescent display tubes in which the MoO$_3$ powder was added in the added amount as shown in a left column of Table 3.

Referring to the result shown in Table 3, in the state before the improvement where the added amount of MO$_3$ was 0%, the initial brightness is represented by 100 as a relative value, and the residual ratio of the brightness after the 1000 hour continuous lighting is 52% of the initial brightness. Therefore, the relative value of the brightness after the 1000 hour continuous lighting is 52 with respect to the initial brightness in the state before the improvement where MO$_3$ was not added.

Considering the effect on the life span and the relative attenuation in the initial brightness, the life span of the SrTiO$_3$:Pr phosphor can be improved to make it attractive for a practical application if the added amount of the MoO$_3$ is in the range from 0.1 wt % to 50 wt % shown in Table 3. That is, in this range, the initial brightness (which is in a range from 61 to 101) is not less than 60% of that in the state before the improvement, and the residual ratio of the brightness after 1000 hour lighting (which is in a range from 65 to 92) is higher than that in the state before the improvement, which means that the brightness after 1000 hour lighting is about in a range from 56 to 67.

Further, an effective range of the added amount is from 0.1 to 50 wt %, and a preferable range of the added amount is from 0.1 to 30 wt %. In the range from 0.1 to 30 wt %, the initial brightness (which is in a range from 70 to 101) in the state before the improvement, and the residual ratio of the brightness after 1000 hour lighting (which is in a range from 65 to 88) is higher than that in the state before the improvement, which means that the brightness after 1000 hour lighting is about in a range from 61 to 67. Moreover, the range from 0.1 to 1 wt % is more preferable in that the brightness after the 1000 hour continuous lighting is about in a range from 64 to 67.

Investigating a surface condition of the SrTiO$_3$:Pr phosphor to which MoO$_3$ was added by using an EDX or XPS analysis, it was observed that MoO$_3$ grains were attached to surfaces of SrTiO$_3$:Pr phosphor grains. This can be interpreted to be resulted from the MoO$_3$ grains being partially melted to be attached to the surfaces of the SrTiO$_3$:Pr phosphor grains when the printing paste of the SrTiO$_3$:Pr phosphor to which MoO$_3$ was added was baked at 450° C. in a fabrication process of the fluorescent display tube.

Third Embodiment

Although WO$_3$ is added to the SrTiO$_3$:Pr phosphor in the first embodiment, tungsten (W) may be added thereto instead as an additive. In this case, tungsten (W) is oxidized to form WO$_3$ grains by being baked at a predetermined proper temperature in a baking process in a fabrication process of the fluorescent display tube, thereby being attached to the surfaces of the SrTiO$_3$:Pr phosphor grains. Thus, an effect equivalent to the first embodiment can be achieved.

To be specific, the added amount of the tungsten (W) is changed stepwise in a range from 0 to 50 wt % including a range from 0.1 to 30 wt % as in the first embodiment, thereby forming several kinds of printing pastes. Herein, 0% represents a state before the improvement where no additive was added to the SrTiO$_3$:Pr phosphor.

FIG. 8 shows a schematic cross sectional view of an exemplary fluorescent display tube 100 which can be employed in the present embodiment. Each printing paste produced as described above is then coated on an anode electrode 110 of a fluorescent display tube 100 and baked at 550° C. Thus, as shown in FIG. 8, a phosphor layer 111 is formed on the anode electrode 110 on a base substrate 103. Thereafter, filament cathodes 112 are positioned above the anode electrode 111, and a casing 101 of an open box shape is covered thereon and sealed. Finally, an inside of the fluorescent display tube 100 is evacuated to a high vacuum state, wherein the casing 101 includes a top plate 102 and side plates 104 and 105. In this manner, several kinds of fluorescent display tubes were obtained at several stages in the range from 0 to 50 wt % of the added amount of the tungsten (W) with respect to the SrTiO$_3$:Pr phosphor.

Figure 4:
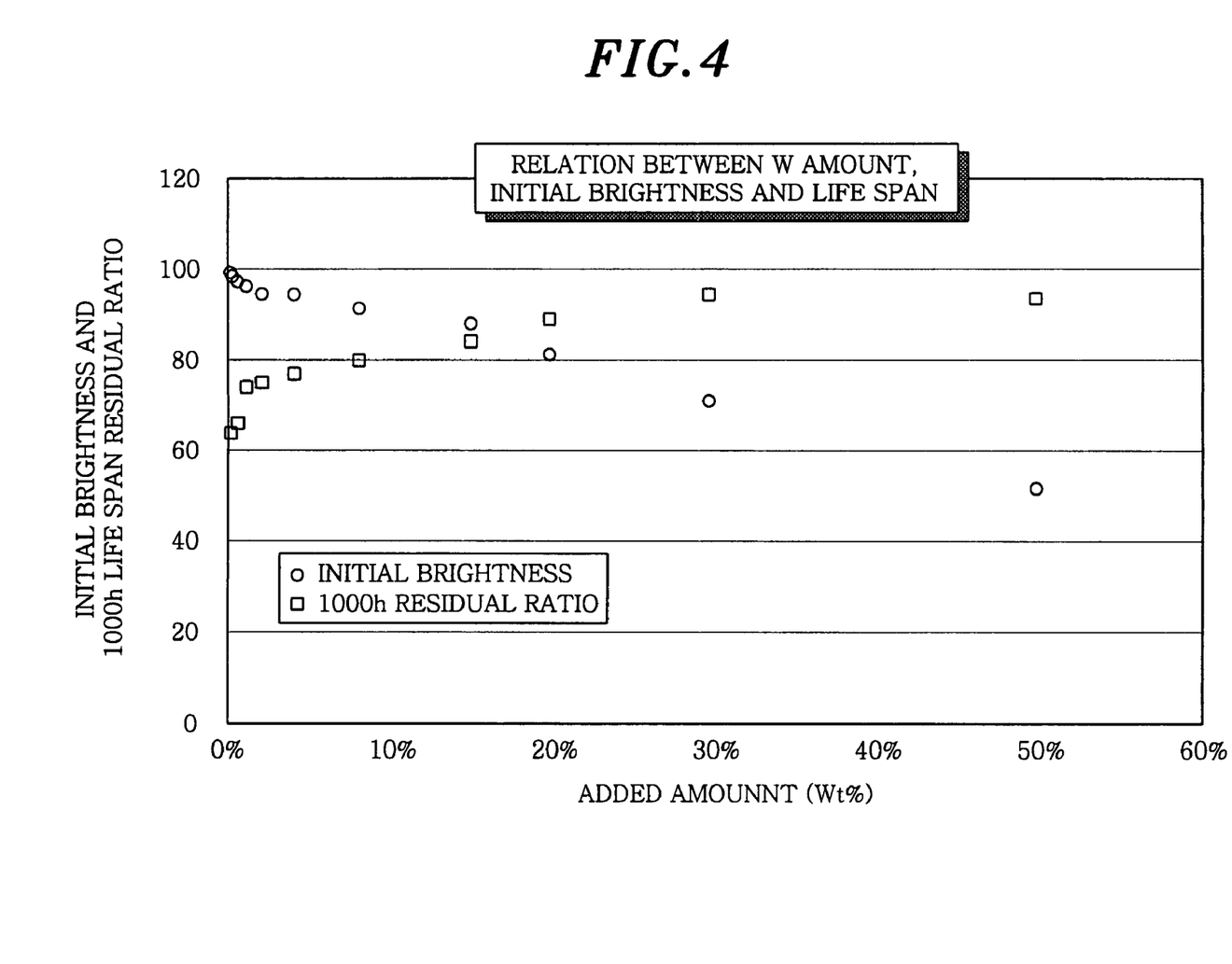
FIG. 4 describes a dependence of the initial brightness and that of the life span on an added amount of W in accordance with a third embodiment of the present invention.

The brightness characteristics, i.e., an initial brightness and a residual ratio of brightness after a 1000 hour continuous lighting, were measured by connecting a 30V voltage source to the anode electrode, so that the results shown in a middle and a right column of Table 4 as well as FIG. 4 were obtained for the respective fluorescent display tubes in which the tungsten (W) was added in the added amount as shown in a left column of Table 4.

TABLE 4

| W Amount | Initial Brightness | 1000 h Residual Ratio |
|---|---|---|
| 0 wt % | 100 | 52 |
| 0.10 wt % | 100 | 65 |
| 0.50 wt % | 98 | 67 |
| 1 wt % | 97 | 75 |
| 2 wt % | 95 | 76 |
| 4 wt % | 95 | 78 |
| 8 wt % | 92 | 81 |
| 15 wt % | 89 | 85 |
| 20 wt % | 82 | 90 |
| 30 wt % | 72 | 95 |
| 50 wt % | 52 | 94 |

Referring to the result shown in Table 4, in the state before the improvement where the added amount of tungsten (W) was 0%, the initial brightness is represented by 100 as a relative value, and the residual ratio of the brightness after the 1000 hour continuous lighting is 52% of the initial brightness. Therefore, the relative value of the brightness after the 1000 hour continuous lighting is 52 with respect to the initial brightness in the state before the improvement where tungsten (W) was not added.

Considering the effect on the life span and the relative attenuation in the initial brightness, the life span of the $SrTiO_3$:Pr phosphor can be improved to make it attractive for a practical application if the added amount of the tungsten (W) is in the range from 0.1 wt % to 30 wt % shown in Table 4. That is, in this range, the initial brightness (which is 72 to 100) is not less than 70% of that in the state before the improvement, and the residual ratio of the brightness after 1000 hour lighting (which is 65 to 95) is higher than that of the state before the improvement, which means that the brightness after 1000 hour lighting is about in a range from 65 to 74.

Further, although an effective range of the added amount is from 0.1 to 30 wt % as described above, a range from 0.1 to 20 wt % is more preferable. In the range from 0.1 to 20 wt %, the initial brightness (which is 82 to 97) is not less than 80% of that in the state before the improvement, and the residual ratio of the brightness after 1000 hour lighting (which is 75 to 90) is higher than that of the state before the improvement, which means that the brightness after 1000 hour lighting is about in a range from 72 to 76.

Investigating a surface condition of the $SrTiO_3$:Pr phosphor to which tungsten (W) was added by using an EDX or XPS analysis, it was observed that $WO_3$ grains were attached to surfaces of $SrTiO_3$:Pr phosphor grains. This can be interpreted to be resulted from the tungsten (W) being oxidized to form $WO_3$ grains and then partially melted to be attached to the surfaces of the $SrTiO_3$:Pr phosphor grains when the printing paste of the $SrTiO_3$:Pr phosphor to which the tungsten (W) was added was baked at 550° C. in a fabrication process of the fluorescent display tube.

Fourth Embodiment

Although $MoO_3$ was added to the SrTiO3:Pr phosdphor in the second embodiment, molybdenum (Mo) may be added thereto instead as an additive. In this case, molybdenum (Mo) is oxidized to form $MoO_3$ grains by being baked at a predetermined proper temperature in a baking process in a fabrication process of the fluorescent display tube, thereby being at least partially melted to be attached to the surfaces of the $SrTiO_3$:Pr phosphor grains. Thus, an effect equivalent to the first embodiment can be achieved.

To be specific, the added amount of the molybdenum (Mo) is changed stepwise in a range from 0 to 50 wt % including a range from 0.1 to 30 wt % as in the first embodiment, thereby forming several kinds of printing pastes. Herein, 0% represents a state before the improvement where no additive was added to the $SrTiO_3$:Pr phosphor.

FIG. 8 shows a schematic cross sectional view of an exemplary fluorescent display tube 100 which can be employed in the present embodiment. Each printing paste produced as described above is then coated on an anode electrode 110 of a fluorescent display tube 100 and baked at 400° C. Thus, as shown in FIG. 8, a phosphor layer 111 is formed on the anode electrode 110 on a base substrate 103. Thereafter, filament cathodes 112 are positioned above the anode electrode 111, and a casing 101 of an open box shape is covered thereon and sealed. Finally, an inside of the fluorescent display tube 100 is evacuated to a high vacuum state, wherein the casing 101 includes a top plate 102 and side plates 104 and 105. In this manner, several kinds of fluorescent display tubes were obtained at several stages in the range from 0 to 50 wt % of the added amount of the molybdenum (Mo) powder with respect to the $SrTiO_3$:Pr phosphor.

Figure 5:
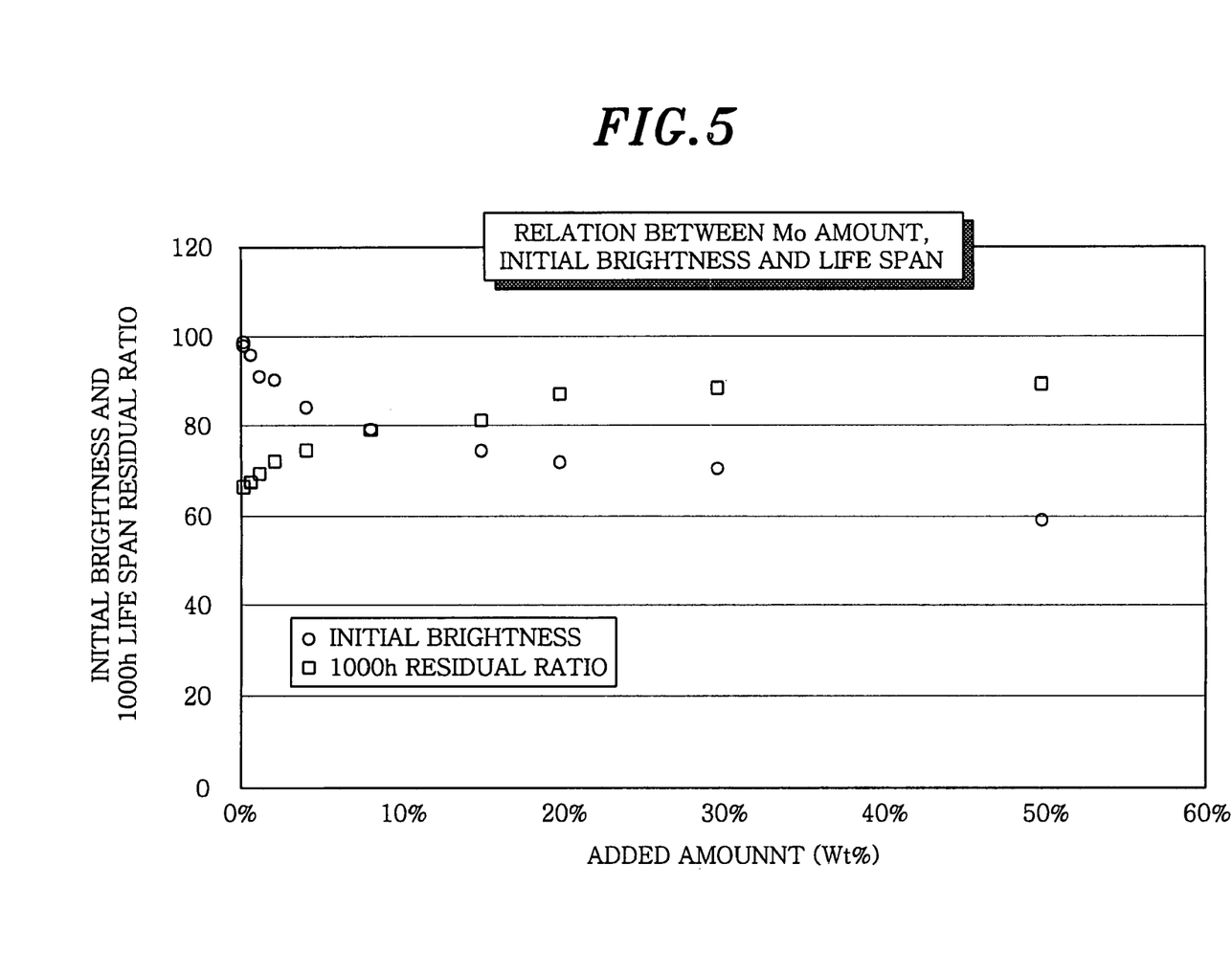
FIG. 5 presents a dependence of the initial brightness and that of the life span on an added amount of Mo in accordance with a fourth embodiment of the present invention.

The brightness characteristics, i.e., an initial brightness and a residual ratio of brightness after a 1000 hour continuous lighting, were measured by connecting a 20V voltage source to the anode electrode, so that the results shown in a middle and a right column of Table 5 as well as FIG. 5 were obtained for the respective fluorescent display tubes in which the molybdenum (Mo) powder was added in the added amount as shown in a left column of Table 5.

TABLE 5

| Mo Amount | Initial Brightness | 1000 h Residual Ratio |
|---|---|---|
| 0 wt % | 100 | 52 |
| 0.10 wt % | 99 | 67 |
| 0.50 wt % | 97 | 68 |
| 1 wt % | 92 | 70 |
| 2 wt % | 91 | 73 |
| 4 wt % | 85 | 75 |
| 8 wt % | 80 | 80 |
| 15 wt % | 75 | 82 |
| 20 wt % | 72 | 88 |
| 30 wt % | 71 | 89 |
| 50 wt % | 59 | 90 |

Referring to the result shown in Table 5, in the state before the improvement where the added amount of molybdenum (Mo) was 0%, the initial brightness is represented by 100 as a relative value, and the residual ratio of the brightness after the 1000 hour continuous lighting is 52% of the initial brightness. Therefore, the relative value of the brightness after the 1000 hour continuous lighting is 52 with respect to the initial brightness in the state before the improvement where molybdenum (Mo) was not added.

Considering the effect on the life span and the relative attenuation in the initial brightness, the life span of the $SrTiO_3$:Pr phosphor can be improved to make it attractive for a practical application if the added amount of the molybdenum (Mo) is in the range from 0.1 wt % to 30 wt % shown in Table 5. That is, in this range, the initial brightness (which is in a range from 71 to 99) is not less than 70% of that in the state before the improvement, and the residual ratio of the brightness after 1000 hour lighting (which is in a range from 67 to 89) is higher than that of the state before the improvement, which means that the brightness after 1000 hour lighting is about in a range from 62 to 66.

Further, although an effective range of the added amount is from 0.1 to 30 wt % as described above, a range from 0.1 to 20 wt % is more preferable. In the range from 0.1 to 20 wt %, the initial brightness (which is in a range from 72 to 92) is not less than 70% of that in the state before the improvement, and the residual ratio of the brightness after 1000 hour lighting (which is in a range from 70 to 88) is higher than that of the state before the improvement, which means that the brightness after 1000 hour lighting is about in a range from 62 to 66.

Investigating a surface condition of the $SrTiO_3$:Pr phosphor to which molybdenum (Mo) was added by using an EDX or XPS analysis, it was observed that $MoO_3$ grains were attached to surfaces of $SrTiO_3$:Pr phosphor grains. This can be interpreted to be resulted from the molybdenum (Mo) being oxidized to form $MoO_3$ grains and then partially melted to be attached to the surfaces of the $SrTiO_3$:Pr phosphor grains when the printing paste of the $SrTiO_3$:Pr phosphor to which the molybdenum (Mo) was added was baked at 400° C. in a fabrication process of the fluorescent display tube.

Fifth Embodiment

In accordance with a sixth embodiment of the present invention, $V_2O_5$ is added in lieu of $WO_3$ in the first embodiment. Except for this, all the conditions are same as those of the first embodiment. A several kinds of fluorescent display tubes were obtained and measurements thereon were performed in a same way as in the first embodiment.

Figure 6:
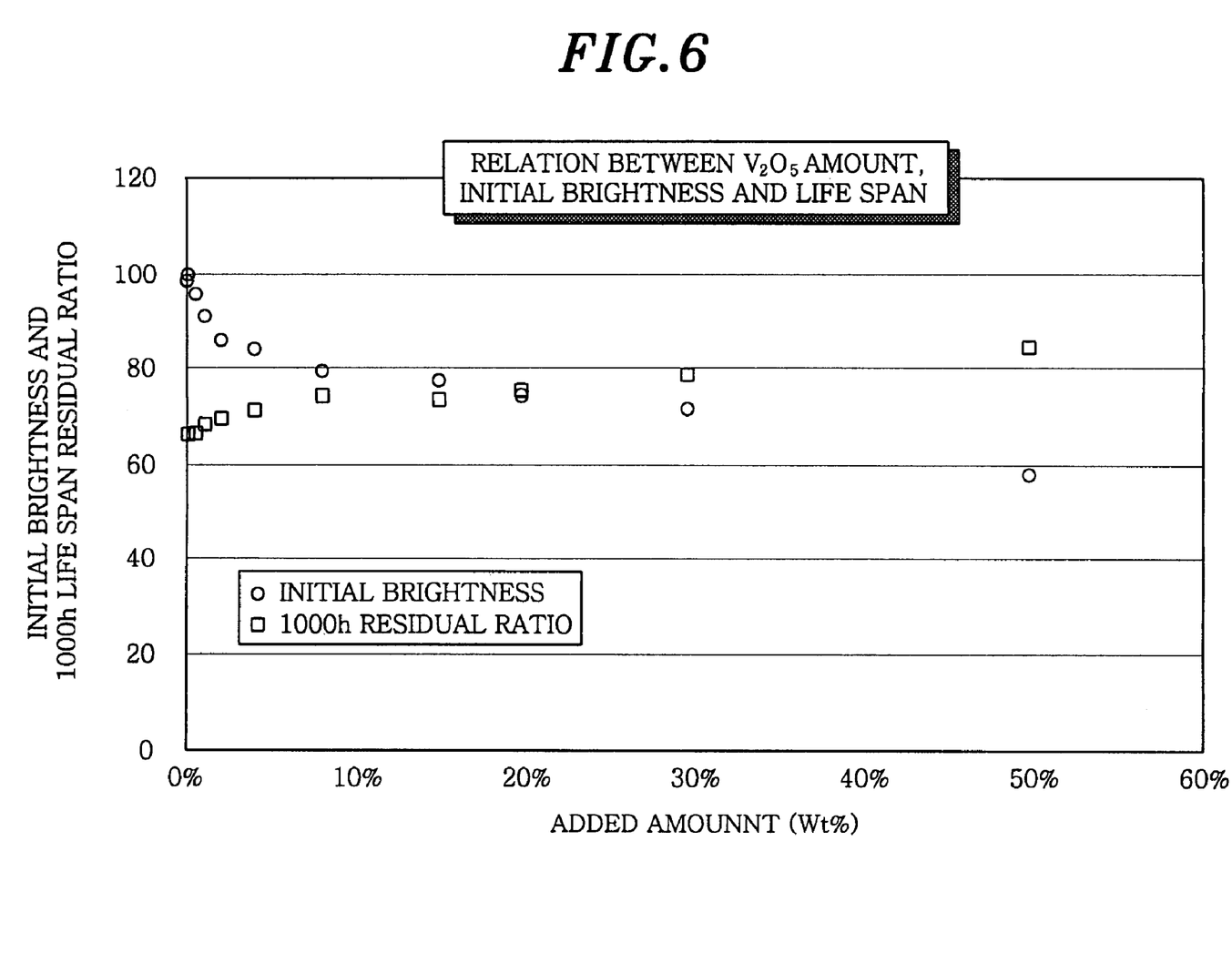
FIG. 6 depicts a dependence of the initial brightness and that of the life span on an added amount of $V_2O_5$ in accordance with a fifth embodiment of the present invention.

Referring to the result shown in Table 6 and FIG. 6, in the state before the improvement where the added amount of $V_2O_5$ was 0%, the initial brightness is represented by 100 as a relative value, and the residual ratio of the brightness after the 1000 hour continuous lighting is 52% of the initial brightness. Therefore, the relative value of the brightness after the 1000 hour continuous lighting is 52 with respect to the initial brightness in the state before the improvement where $V_2O_5$ was not added.

TABLE 6

| $V_2O_5$ Amount | Initial Brightness | 1000 h Residual Ratio |
| --- | --- | --- |
| 0 wt % | 100 | 52 |
| 0.10 wt % | 101 | 67 |
| 0.50 wt % | 97 | 67 |
| 1 wt % | 92 | 69 |
| 2 wt % | 87 | 70 |
| 4 wt % | 85 | 72 |
| 8 wt % | 80 | 75 |
| 15 wt % | 78 | 74 |
| 20 wt % | 75 | 76 |
| 30 wt % | 72 | 79 |
| 50 wt % | 58 | 85 |

Considering the effect on the life span and the relative attenuation in the initial brightness, the life span of the $SrTiO_3$:Pr phosphor can be improved to make it attractive for a practical application if the added amount of the $V_2O_5$ is in the range from 0.1 wt % to 30 wt % shown in Table 6. That is, in this range, the initial brightness (which is in a range from 72 to 101) is not less than 70% of that in the state before the improvement, and the residual ratio of the brightness after 1000 hour lighting (which is in a range from 67 to 79) is higher than that of the state before the improvement, which means that the brightness after 1000 hour lighting is about in a range from 57 to 68.

Further, although an effective range of the added amount is from 0.1 to 30 wt % as described above, a range from 0.1 to 1 wt % is more preferable. In the range from 0.1 to 1 wt %, the initial brightness (which is in a range from 92 to 101) is not less than 90% of that in the state before the improvement, and the residual ratio of the brightness after 1000 hour lighting (which is in a range from 67 to 69) is higher than that of the state before the improvement, which means that the brightness after 1000 hour lighting is about in a range from 63 to 68.

Investigating a surface condition of the $SrTiO_3$:Pr phosphor to which $V_2O_5$ was added by using an EDX or XPS analysis, it was observed that $V_2O_5$ grains were attached to surfaces of $SrTiO_3$:Pr phosphor grains. This can be interpreted to be resulted from the $V_2O_5$ grains being partially melted to be attached to the surfaces of the $SrTiO_3$:Pr phosphor grains when the printing paste of the $SrTiO_3$:Pr phosphor to which $V_2O_5$ was added was baked at 500° C. in a fabrication process of the fluorescent display tube.

Sixth Embodiment

Although $V_2O_5$ was added to the $SrTiO_3$:Pr phosphor in the first embodiment, vanadium (V) may be added thereto instead as an additive. In this case, vanadium (V) is oxidized to form $V_2O_5$ grains by being baked at a predetermined proper temperature in a baking process in a fabrication process of the fluorescent display tube, thereby being attached to the surfaces of the $SrTiO_3$:Pr phosphor grains. Thus, an effect equivalent to the fifth embodiment can be achieved.

To be specific, the added amount of the vanadium (V) is changed stepwise in a range from 0 to 50 wt % including a range from 0.1 to 30 wt % in a same manner as tungsten (W) was changed in the third embodiment, thereby forming several kinds of printing pastes. Herein, 0% represents a state before the improvement where no additive was added to the $SrTiO_3$:Pr phosphor.

FIG. 8 shows a schematic cross sectional view of an exemplary fluorescent display tube 100 which can be employed in the present embodiment. Each printing paste produced as described above is then coated on an anode electrode 110 of a fluorescent display tube 100 and baked at 400° C. Thus, as shown in FIG. 8, a phosphor layer 111 is formed on the anode electrode 110 on a base substrate 103. Thereafter, filament cathodes 112 are positioned above the anode electrode 111, and a casing 101 of an open box shape is covered thereon and sealed. Finally, an inside of the fluorescent display tube 100 is evacuated to a high vacuum state, wherein the casing 101 includes a top plate 102 and side plates 104 and 105. In this manner, several kinds of fluorescent display tubes were obtained at several stages in the range from 0 to 50 wt % of the added amount of the vanadium (V) with respect to the $SrTiO_3$:Pr phosphor.

Figure 7:
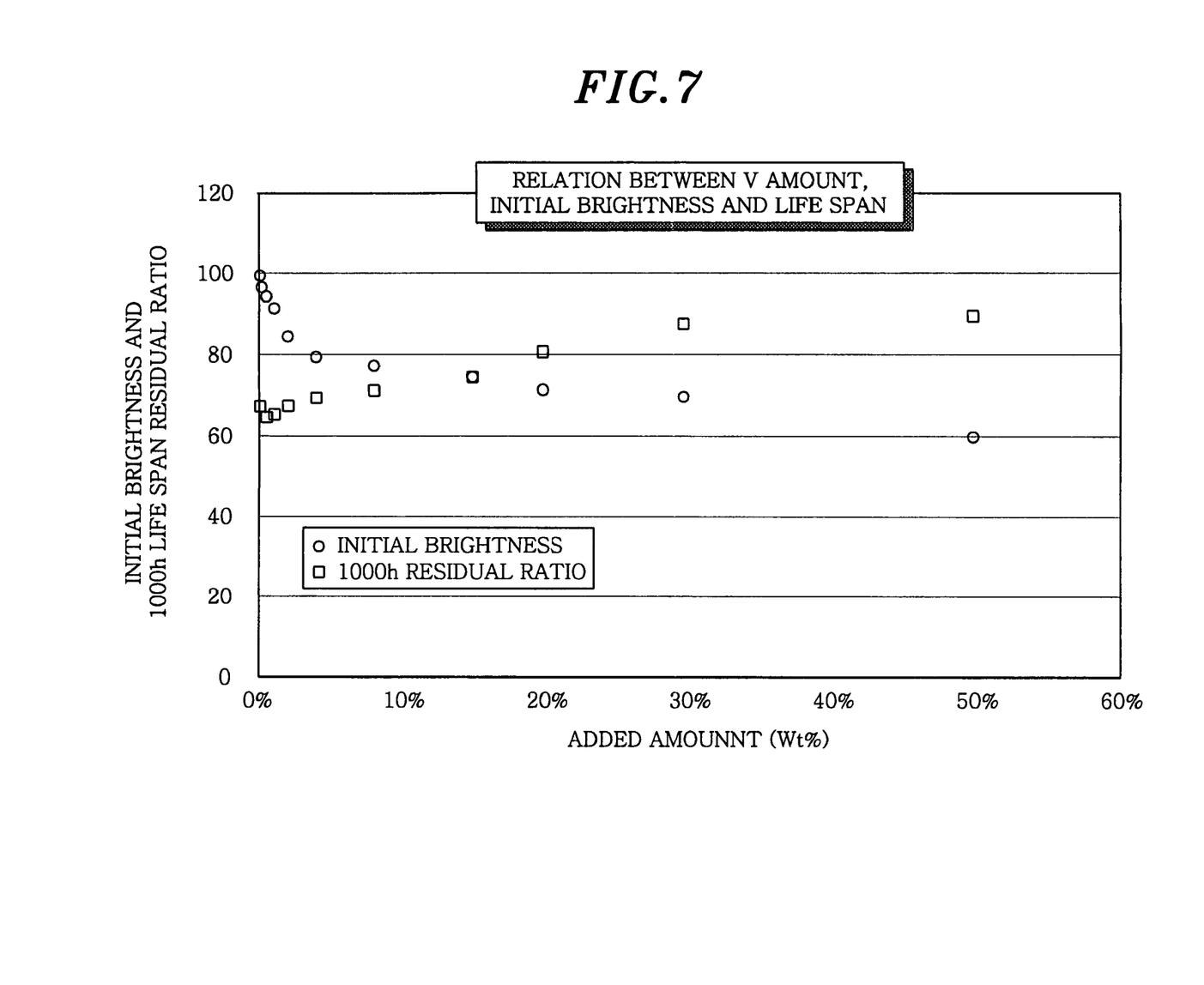
FIG. 7 represents a dependence of the initial brightness and that of the life span in accordance with a sixth embodiment of the present invention.

The brightness characteristics, i.e., an initial brightness and a residual ratio of brightness after a 1000 hour continuous lighting, were measured by attaching a 30V voltage source to the anode electrode, so that the results shown in a middle and a right column of Table 7 as well as FIG. 7 were obtained for the respective fluorescent display tubes in which the vanadium (V) was added in the added amount as shown in a left column of Table 7.

TABLE 7

| V Amount | Initial Brightness | 1000 h Residual Ratio |
| --- | --- | --- |
| 0 wt % | 100 | 52 |
| 0.10 wt % | 97 | 68 |
| 0.50 wt % | 95 | 65 |
| 1 wt % | 92 | 66 |
| 2 wt % | 85 | 68 |

TABLE 7-continued

| V Amount | Initial Brightness | 1000 h Residual Ratio |
|---|---|---|
| 4 wt % | 80 | 70 |
| 8 wt % | 78 | 72 |
| 15 wt % | 75 | 75 |
| 20 wt % | 72 | 81 |
| 30 wt % | 70 | 88 |
| 50 wt % | 60 | 90 |

Referring to the result shown in Table 7, in the state before the improvement where the added amount of vanadium (V) was 0%, the initial brightness is represented by 100 as a relative value, and the residual ratio of the brightness after the 1000 hour continuous lighting is 52% of the initial brightness. Therefore, the relative value of the brightness after the 1000 hour continuous lighting is 52 with respect to the initial brightness in the state before the improvement where vanadium (V) was not added.

Considering the effect on the life span and the relative attenuation in the initial brightness, the life span of the $SrTiO_3$:Pr phosphor can be improved to make it attractive for a practical application if the added amount of the vanadium (V) is in the range from 0.1 wt % to 50 wt % shown in Table 7. That is, in this range, the initial brightness (which is in a range from 60 to 97) is not less than 60% of that in the state before the improvement, and the residual ratio of the brightness after 1000 hour lighting (which is in a range from 65 to 90) is higher than that of the state before the improvement, which means that the brightness after 1000 hour lighting is about in a range from 54 to 66.

Further, although an effective range of the added amount is from 0.1 to 50 wt % as described above, a range from 0.1 to 30 wt % is more preferable. In the range from 0.1 to 30 wt %, the initial brightness (which is in a range from 70 to 97) is not less than 70% of that in the state before the improvement, and the residual ratio of the brightness after 1000 hour lighting (which is in a range from 65 to 88) is higher than that of the state before the improvement, which means that the brightness after 1000 hour lighting is about in a range from 56 to 66.

Investigating a surface condition of the $SrTiO_3$:Pr phosphor to which vanadium (V) was added by using an EDX or XPS analysis, it was observed that $V_2O_5$ grains were attached to surfaces of $SrTiO_3$:Pr phosphor grains. This can be interpreted to be resulted from the vanadium (V) being oxidized to form $V_2O_5$ grains and then partially melted to be attached to the surfaces of the $SrTiO_3$:Pr phosphor grains when the printing paste of the $SrTiO_3$:Pr phosphor to which the vanadium (V) was added was baked at 400° C. in a fabrication process of the fluorescent display tube.

Further, aluminum (Al) or gallium (Ga) may be added in a predetermined proper small amount to the $SrTiO_3$:Pr phosphor used in the preferred embodiments described above. These elements in a small amount are, if added to the $SrTiO_3$:Pr phosphor, capable of enhancing a crystallinity of the parent material to improve an efficiency of the light emission.

As described in the preferred embodiments, in accordance with the present invention, a life span of a $SrTiO_3$:Pr phosphor for emitting light whose emission wavelength ranges from yellow to red can be improved to make it attractive for a practical application. Thus, the life span of the $SrTiO_3$:Pr phosphor can be improved to a level at least similar to that of a ZnO:Zn phosphor, so that an industrial applicability thereof can be enhanced.

Therefore, by using the phosphor in accordance with the present invention for an anode light emitting unit in a fluorescent luminous tube, a light emitting display from yellow to red can be implemented with a secured life span without using environmentally unfriendly materials such as cadmium (Cd), so that the display can be diversified efficiently.

Furthermore, the phosphor in accordance with the present invention can be applied to any fluorescent luminous tubes as long as they have a phosphor in a light emitting unit in which electron collisions occur, and no further condition for luminous tube configuration is required for its application. That is, for example, the phosphor in accordance with the present invention can be applied to a fluorescent display tube for emitting light by accelerating electrons emitted from a filament coated with an electron emitting material at an acceleration voltage of about 1 kV to make the electrons collide with an anode electrode having a phosphor, a field emission display using a field emission device as an electron source, and the like.

While the invention has been shown and described with respect to the preferred embodiments, it will be understood by those skilled in the art that various changes and modification may be made without departing from the scope of the invention as defined in the following claims.

What is claimed is:

1. A $SrTiO_3$:Pr phosphor comprising:
    a $SrTiO_3$:Pr phosphor material; and
    an additive including one or more elements selected from the group consisting of Mo and V in a form of an elemental substance and/or a metal oxide wherein the additive is of a granular shape and resides on surfaces of grains of the $SrTiO_3$:Pr phosphor material.

2. The $SrTiO_3$:Pr phosphor of claim 1, wherein a total amount of Mo and/or V included in the additive is in a range from 0.1 wt % to 30 wt % of the $SrTiO_3$:Pr phosphor.

3. A $SrTiO_3$:Pr phosphor comprising:
    a $SrTiO_3$:Pr phosphor material; and
    a $WO_3$ additive,
    wherein a total amount of W included in the $W_3$ additive is in a range from 0.1 wt % to 30 wt % of the $SrTiO_3$:Pr phosphor,
    wherein the $WO_3$ additive is of a granular shape and resides on surfaces of grains of the $SrTiO_3$:Pr phosphor material, wherein the $SrTiO_3$:Pr phosphor is formed by mixing and baking $WO_3$ powder and $SrTiO_3$:Pr phosphor material powder; and wherein a particle size distribution of the $WO_3$ powder is such that a weight of $WO_3$ particles whose diameters are in a range from 0.2 to 0.4 μm is not less than 70 wt % of a total weight of the $WO_3$ powder, and a particle size distribution of the $SrTiO_3$:Pr phosphor material powder is such that a weight of the $SrTiO_3$:Pr phosphor particles whose diameters are in a range from 2 to 4 μm is not less than 70 wt % of a total weight of the $SrTiO_3$:Pr phosphor material powder.

4. A fluorescent luminous tube comprising the $SrTiO_3$:Pr phosphor of claim 1.

5. A fluorescent luminous tube comprising the $SrTiO_3$:Pr phosphor of claim 2.

6. A fluorescent luminous tube comprising the $SrTiO_3$:Pr phosphor of claim 3.

7. The $SrTiO_3$:Pr phosphor of claim 1, wherein the additive includes one element selected from the group consisting of Mo and V in a form of an elemental substance and/or a metal oxide, and
    wherein a total amount of Mo or V included in the additive is in a range from 0.1 wt % to 30 wt % of the $SrTiO_3$:Pr phosphor.

8. The $SrTiO_3$:Pr phosphor of claim 1, wherein the additive is $MoO_3$, and the $SrTiO_3$:Pr phosphor is formed by mixing and baking $MoO_3$ powder and $SrTiO_3$:Pr phosphor material powder; and wherein a particle size distribution of the $MoO_3$ powder is such that a weight of $MoO_3$ particles whose diameters are in a range from 0.2 to 0.4 μm is not less than 70 wt % of a total weight of the $MoO_3$ powder, and a particle size distribution of the $SrTiO_3$:Pr phosphor material powder is such that a weight of the $SrTiO_3$:Pr phosphor particles whose diameters are in a range from 2 to 4 μm is not less than 70 wt % of a total weight of the $SrTiO_3$:Pr phosphor material powder.

9. The $SrTiO_3$:Pr phosphor of claim 1, wherein the additive is the compound of an metal oxide, and the $SrTiO_3$:Pr phosphor is formed by mixing and baking compound powder of the metal oxide and $SrTiO_3$:Pr phosphor material powder; and wherein a particle size distribution of the compound powder is such that a weight of the compound powder particles whose diameters are in a range from 0.2 to 0.4 μm is not less than 70 wt % of a total weight of the compound powder, and a particle size distribution of the $SrTiO_3$:Pr phosphor material powder is such that a weight of the $SrTiO_3$:Pr phosphor particles whose diameters are in a range from 2 to 4 μm is not less than 70 wt % of a total weight of the $SrTiO_3$:Pr phosphor material powder.

10. A $SrTiO_3$:Pr phosphor comprising:
a $SrTiO_3$:Pr phosphor material; and
an additive including W in a form of an elemental substance and/or a metal oxide
wherein the additive is of a granular shape and resides on surfaces of grains of the $SrTiO_3$:Pr phosphor material, and
wherein the additive is $WO_3$, and the $SrTiO_3$:Pr phosphor is formed by mixing and baking $WO_3$ powder and $SrTiO_3$:Pr phosphor material powder; and wherein a particle size distribution of the $WO_3$ powder is such that a weight of $WO_3$ particles whose diameters are in a range from 0.2 to 0.4 μm is not less than 70 wt % of a total weight of the $WO_3$ powder, and a particle size distribution of the $SrTiO_3$:Pr phosphor material powder is such that a weight of the $SrTiO_3$:Pr phosphor particles whose diameters are in a range from 2 to 4 μm is not less than 70 wt % of a total weight of the $SrTiO_3$:Pr phosphor material powder.

11. A fluorescent luminous tube comprising the $SrTiO_3$:Pr phosphor of claim 10.

* * * * *

UNITED STATES PATENT AND TRADEMARK OFFICE
CERTIFICATE OF CORRECTION

PATENT NO.        : 7,604,752 B2                                          Page 1 of 1
APPLICATION NO. : 11/338764
DATED             : October 20, 2009
INVENTOR(S)       : Yamada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 424 days.

Signed and Sealed this

Fifth Day of October, 2010

David J. Kappos
*Director of the United States Patent and Trademark Office*